United States Patent
Maze et al.

(10) Patent No.: US 12,439,105 B2
(45) Date of Patent: Oct. 7, 2025

(54) METHOD, DEVICE, AND COMPUTER PROGRAM FOR ENCAPSULATING MEDIA DATA INTO A MEDIA FILE

(71) Applicant: CANON KABUSHIKI KAISHA, Tokyo (JP)

(72) Inventors: Frédéric Maze, Langan (FR); Franck Denoual, Saint Domineuc (FR); Naël Ouedraogo, Val d'Anast (FR); Jean Le Feuvre, Gometz-le-Chatel (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/762,261

(22) PCT Filed: Sep. 22, 2020

(86) PCT No.: PCT/EP2020/076443
§ 371 (c)(1),
(2) Date: Mar. 21, 2022

(87) PCT Pub. No.: WO2021/058488
PCT Pub. Date: Apr. 1, 2021

(65) Prior Publication Data
US 2022/0360831 A1    Nov. 10, 2022

(30) Foreign Application Priority Data

Sep. 24, 2019  (GB) .................... 1913766

(51) Int. Cl.
*H04N 21/2343* (2011.01)
*H04N 19/44* (2014.01)
*H04N 21/854* (2011.01)

(52) U.S. Cl.
CPC ....... *H04N 21/23439* (2013.01); *H04N 19/44* (2014.11); *H04N 21/85406* (2013.01)

(58) Field of Classification Search
CPC ............. H04N 21/23439; H04N 19/44; H04N 21/8455; H04N 21/2353; H04N 21/435;
(Continued)

(56) References Cited

U.S. PATENT DOCUMENTS

2007/0022215 A1* 1/2007 Singer ............ H04N 21/234363
707/E17.031
2010/0153395 A1* 6/2010 Hannuksela ..... H04N 21/85406
707/E17.089
(Continued)

FOREIGN PATENT DOCUMENTS

| CN | 102714715 A | 10/2012 |
| CN | 105052167 A | 11/2015 |

(Continued)

OTHER PUBLICATIONS

Ray Van Brandenburg Text of ISO/IEC 14496-15 5th edition CDAM 1 HEVC carriage improvements—Jul. 2019 (Year: 2019).*
(Continued)

*Primary Examiner* — Chris Parry
*Assistant Examiner* — Dixon F Dabipi
(74) *Attorney, Agent, or Firm* — Canon U.S.A., Inc. IP Division

(57) ABSTRACT

The invention relates to providing default constructors to be used by reference in extractors of an extractor tracks in order to reduce the size of the extractor track when a same constructor is used in different extractors.

18 Claims, 7 Drawing Sheets

(58) Field of Classification Search
CPC .. H04N 19/174; H04N 19/70; H04N 21/2343; H04N 21/845
See application file for complete search history.

(56) References Cited

U.S. PATENT DOCUMENTS

| | | | | |
|---|---|---|---|---|
| 2011/0064146 | A1* | 3/2011 | Chen | H04N 21/234327 375/240.26 |
| 2016/0014480 | A1* | 1/2016 | Maze | H04N 21/8456 725/116 |
| 2019/0174161 | A1* | 6/2019 | Skupin | H04N 19/167 |
| 2020/0260063 | A1* | 8/2020 | Hannuksela | H04N 21/234345 |
| 2021/0194946 | A1* | 6/2021 | Hannuksela | H04N 21/816 |

FOREIGN PATENT DOCUMENTS

| | | |
|---|---|---|
| CN | 105556981 A | 5/2016 |
| EP | 4035412 A1 | 8/2022 |
| GB | 2575074 A | 1/2020 |
| KR | 20150097723 A | 8/2015 |
| KR | 20180016519 A | 2/2018 |
| WO | 2020/008115 A1 | 1/2020 |
| WO | 2021/058488 A1 | 4/2021 |

OTHER PUBLICATIONS

Text of ISO/IEC 14496-15 5th edition CDAM 1 HEVC Carriage Improvements, International Organisation for Standardisation, ISO/IEC JTC1/SC29/WG11, Coding of Moving Pictures and Audio, Jul. 2019, Gothenburg, SE, Doc. No. N18631, XP030221882.

Miska M. Hannuksela, et al., [14496-15] Comments on extractors in the TuC, International Organisation for Standardisation, ISO/IEC JTC1/SC29/WG11, Coding of Moving Pictures and Audio, Mar. 2019, Geneva, CH, Doc. No. M47424, XP030211423.

* cited by examiner

METHOD, DEVICE, AND COMPUTER PROGRAM FOR ENCAPSULATING MEDIA DATA INTO A MEDIA FILE

CROSS-REFERENCE TO RELATED APPLICATIONS

This application is the National Phase application of PCT Application No. PCT/EP2020/076443, filed on Sep. 22, 2020 and titled "METHOD, DEVICE, AND COMPUTER PROGRAM FOR ENCAPSULATING MEDIA DATA INTO A MEDIA FILE". This application claims the benefit under 35 U.S.C. § 119(a)-(d) of United Kingdom Patent Application No. 1913766.0, filed on Sep. 24, 2019. The above cited patent applications are incorporated herein by reference in their entirety.

FIELD OF THE INVENTION

The present invention relates to methods and devices for encapsulating and transmitting media data.

BACKGROUND OF THE INVENTION

The International Standard Organization Base Media File Format (ISO BMFF, ISO/IEC 14496-12) is a well-known flexible and extensible file format that encapsulates and describes encoded timed or non-timed media data either for local storage or for transmission via a network or via another bitstream delivery mechanism. An example of extensions is ISO/IEC 14496-15 that describes encapsulation tools for various NAL (Network Abstraction Layer) unit-based video encoding formats. Examples of such encoding formats are AVC (Advanced Video Coding), SVC (Scalable Video Coding), HEVC (High Efficiency Video Coding), and L-HEVC (Layered HEVC). Another example of file format extension is ISO/IEC 23008-12 that describes encapsulation tools for still images or sequence of still images such as HEVC Still Image. Another example of file format extension is ISO/IEC 23090-2 that defines the omnidirectional media application format (OMAF). The ISO Base Media file format is object-oriented. It is composed of building blocks called boxes (or data structures characterized by a unique type identifier, typically a four characters code, also noted FourCC or 4CC). Full boxes are data structures similar to boxes comprising in addition a version and flags value attributes. In the following, the term box may designate both full boxes or boxes. Those boxes or full boxes are hierarchically or sequentially organized in the ISOBMFF file and define parameters describing the encoded timed or non-timed media data, its structure and timing, if any. All data in an encapsulated media file (media data and metadata describing the media data) is contained in boxes. There is no other data within the file. File-level boxes are boxes that are not contained in other boxes.

In the file format, the overall media presentation is called a movie. The movie is described by a movie box (with the four-character code 'moov') at the top level of the file. This movie box represents an initialization information container containing a set of various boxes describing the media presentation. It is logically divided into tracks represented by track boxes (with the four-character code 'trek'). Each track (uniquely identified by a track identifier (track_ID)) represents a timed sequence of media data belonging to the presentation (frames of video or audio samples, for example). Within each track, each timed unit of data is called a sample; this might be a frame of video, audio or timed metadata. Samples are implicitly numbered in decoding order sequence. Each track box contains a hierarchy of boxes describing the samples of a track, e.g. a sample table box ('stbl') contains all the time and data indexing of the media samples in a track. The actual sample data are stored in boxes called Media Data Boxes (with the four-character code 'mdat') or Identified Media Data Boxes (with the four-character code 'imda', similar to the Media Data Box but containing an additional identifier) at the same level as the movie box. The movie can be organized temporally as a movie box containing information for the whole presentation followed by a list of media fragments, i.e., a list of couple movie fragment and Media Data boxes ('mdat' or 'imda'). Within a movie fragment (box with the four character code 'moof') there is a set of track fragments (box with the four character code 'traf') describing the tracks within the media fragment, zero or more per movie fragment. The track fragments in turn contain zero or more track run boxes ('trun'), each of which document a contiguous run of samples for that track fragment.

An ISOBMFF file may contain multiple encoded timed media data or sub-parts of encoded timed media data forming multiple tracks. When sub-parts correspond to one or successive spatial parts of a video source, taken over the time (e.g. at least one rectangular region, sometimes called 'tile' or 'sub-picture', taken over the time), the corresponding multiple tracks may be called tile tracks or sub-picture tracks. ISOBMFF and its extensions comprise several grouping mechanisms to group together tracks, static items, or samples. A group typically shares common semantic and/or characteristics.

The inventors have noticed several problems when describing and signaling information about the media data to transmit, in particular for multiple tracks when one track is referencing another track.

An example involves reducing the cost of the signaling of a data entity that is referenced in another track in particular when the signaling includes mostly repeated values all over the track.

Another example concerns optimizing the signaling of NAL unit length for data entity obtained through extractors.

The existing solutions are either complex or not well defined.

SUMMARY OF THE INVENTION

The present invention has been devised to address one or more of the foregoing concerns.

In this context, there is provided a solution for streaming media content (for example omnidirectional media content), for example over an IP network such as Internet using the http protocol.

According to a first aspect of the invention, it is proposed a method for encapsulating media data into a media file, the method comprising:
  including, in the media file, a first track comprising media samples;
  including, in the media file, a second track comprising an extractor, the extractor being a structure referencing data in a media sample contained in the first track, the extractor comprising at least one constructor; and
  wherein the method further comprises:
  including, in the second track a default constructor;
  wherein the constructor is a reference constructor referencing the default constructor.

In an embodiment, the default constructor is included in a metadata part of the second track.

In an embodiment, the default constructor in the second track is included as a list of default constructors, the reference constructor comprising an index in this list.

In an embodiment, the default constructor is included in a sample entry of the metadata part of the second track.

In an embodiment, the default constructor is included in a sample group entry describing a group of samples of the second track, the extractor being included in a sample of the group of samples.

According to another aspect of the invention, it is proposed a method for encapsulating media data into a media file, the method comprising:
  including, in the media file, a first track comprising media samples;
  including, in the media file, a second track comprising an extractor, the extractor being a structure referencing data in a media sample contained in the first track; and
  wherein the method further comprises:
  including, in the second track a default extractor;
  the extractor included in the second track being a reference extractor referencing the default extractor.

According to another aspect of the invention, it is proposed a method for encapsulating media data into a media file, the method comprising:
  including, in the media file, a first track comprising media samples, each media sample containing a set of one or more NAL units;
  including, in the media file, a second track comprising an extractor, the extractor being a structure referencing data in a media sample contained in the first track, the extractor comprising at least one constructor; and
  wherein the constructor comprises inline data and an information indicating that the inline data does not comprise any NAL unit length field.

According to another aspect of the invention, it is proposed a method for parsing a media data into a media file, the method comprising:
  obtaining, in the media file, a first track comprising media samples;
  obtaining, in the media file, a second track comprising an extractor, the extractor being a structure referencing data in a media sample contained in the first track, the extractor comprising at least one constructor; and
  wherein the method further comprises:
  obtaining, in the second track a default constructor;
  wherein the constructor is a reference constructor referencing the default constructor;
  obtaining from the first track data referenced by the extractor based on the default constructor.

According to another aspect of the invention, it is proposed a method for parsing a media data into a media file, the method comprising:
  obtaining, in the media file, a first track comprising media samples;
  obtaining, in the media file, a second track comprising an extractor, the extractor being a structure referencing data in a media sample contained in the first track; and
  wherein the method further comprises:
  obtaining, in the second track a default extractor;
  the extractor included in the second track being a reference extractor referencing the default extractor;
  obtaining from the first track data referenced by the extractor based on the default extractor.

According to another aspect of the invention, it is proposed a method for parsing a media data into a media file, the method comprising:
  obtaining, in the media file, a first track comprising media samples, each media sample containing a set of one or more NAL units;
  obtaining, in the media file, a second track comprising an extractor, the extractor being a structure referencing data in a media sample contained in the first track, the extractor comprising at least one constructor; and
  wherein the constructor comprises inline data and an information indicating that the inline data does not comprise any NAL unit length field.

According to another aspect of the invention, it is proposed a computer program product for a programmable apparatus, the computer program product comprising a sequence of instructions for implementing a method according to the invention, when loaded into and executed by the programmable apparatus.

According to another aspect of the invention, it is proposed a computer-readable storage medium storing instructions of a computer program for implementing a method according to the invention.

According to another aspect of the invention, it is proposed a computer program which upon execution causes the method of the invention to be performed.

According to another aspect of the invention, it is proposed a device for encapsulating media data into a media file, the device comprising a processor configured for:
  including, in the media file, a first track comprising media samples;
  including, in the media file, a second track comprising an extractor, the extractor being a structure referencing data in a media sample contained in the first track, the extractor comprising at least one constructor; and
  wherein the method further comprises:
  including, in the second track a default constructor;
  including in the extractor, a reference constructor referencing the default constructor.

According to another aspect of the invention, it is proposed a device for encapsulating media data into a media file, the device comprising a processor configured for:
  including, in the media file, a first track comprising media samples;
  including, in the media file, a second track comprising an extractor, the extractor being a structure referencing data in a media sample contained in the first track; and
  wherein the method further comprises:
  including, in the second track a default extractor;
  the extractor included in the second track being a reference extractor referencing the default extractor.

According to another aspect of the invention, it is proposed a device for encapsulating media data into a media file, the device comprising a processor configured for:
  including, in the media file, a first track comprising media samples, each media sample containing a set of one or more NAL units;
  including, in the media file, a second track comprising an extractor, the extractor being a structure referencing data in a media sample contained in the first track, the extractor comprising at least one constructor; and
    wherein the constructor comprises inline data and an information indicating that the inline data does not comprise any NAL unit length field.

According to another aspect of the invention, it is proposed a device for parsing a media data into a media file, the device comprising a processor configured for:

obtaining, in the media file, a first track comprising media samples;

obtaining, in the media file, a second track comprising an extractor, the extractor being a structure referencing data in a media sample contained in the first track, the extractor comprising at least one constructor; and wherein the method further comprises:

obtaining, in the second track a default constructor;

obtaining in the extractor, a reference constructor referencing the default constructor;

obtaining from the first track data referenced by the extractor based on the default constructor.

According to another aspect of the invention, it is proposed a device for parsing a media data into a media file, the device comprising a processor configured for:

obtaining, in the media file, a first track comprising media samples, each media sample containing a set of one or more NAL units;

obtaining, in the media file, a second track comprising an extractor, the extractor being a structure referencing data in a media sample contained in the first track; and wherein the method further comprises:

obtaining, in the metadata part of the second track a default extractor;

the extractor included in the second track being a reference extractor referencing the default extractor;

obtaining from the first track data referenced by the extractor based on the default extractor.

According to another aspect of the invention, it is proposed a device for parsing a media data into a media file, the device comprising a processor configured for:

obtaining, in the media file, a first track comprising media samples, each media sample containing a set of one or more NAL units;

obtaining, in the media file, a second track comprising an extractor, the extractor being a structure referencing data in a media sample contained in the first track, the extractor comprising at least one constructor; and wherein the constructor comprises inline data and an information indicating that the inline data does not comprise any NAL unit length field.

Other aspects of the invention concern a computing device for encapsulating a media data and parsing a media file, and a corresponding computer program.

BRIEF DESCRIPTION OF THE DRAWINGS

Further advantages of the present invention will become apparent to those skilled in the art upon examination of the drawings and detailed description. It is intended that any additional advantages be incorporated herein.

Embodiments of the invention are described below, by way of examples only, and with reference to the following drawings in which.

DETAILED DESCRIPTION OF EMBODIMENTS OF THE INVENTION

Figure 1:
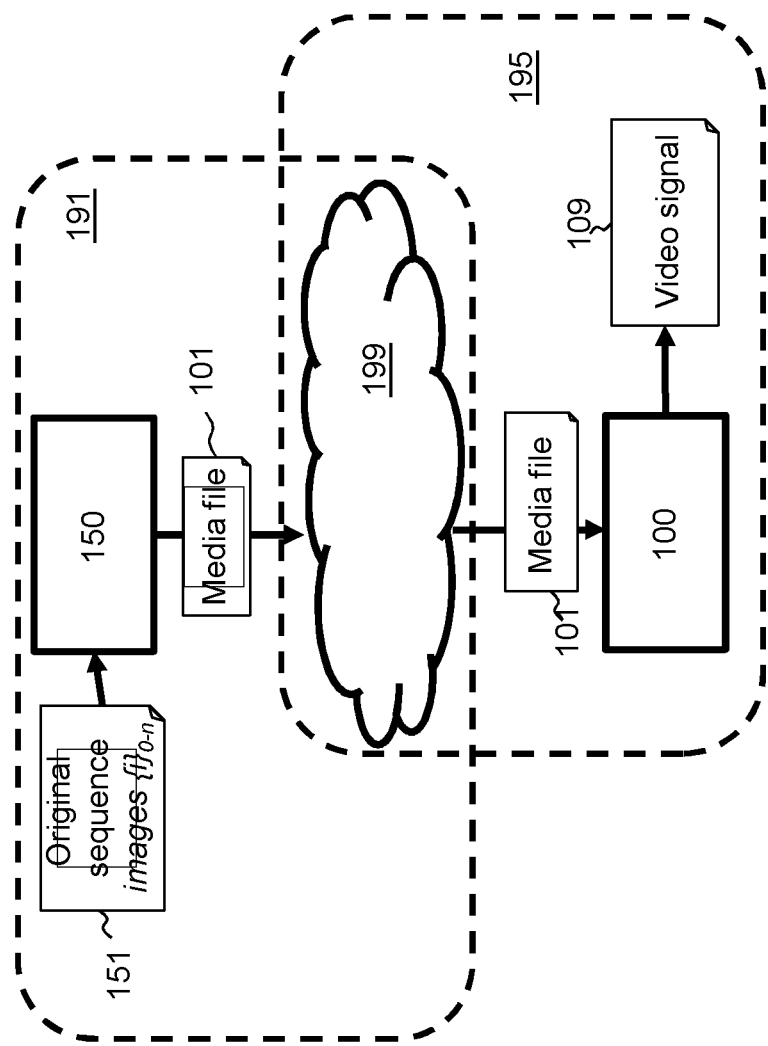
FIG. 1 illustrates exemplary systems comprising encapsulation/de-encapsulation modules adapted to embody embodiments of the present invention.

FIG. 1 illustrates exemplary systems 191 and 195 adapted to embody embodiments of the present invention. The system 191 comprises an encapsulation module 150 connected to a communication network 199. The system 195 comprises a de-encapsulation module 100 connected to the communication network 199.

According to an embodiment, the system 191 is for processing a content, e.g. video, still image and/or audio content, for streaming or storage. The system 191 obtains/receives a content comprising an original non-timed set or timed sequence of images 151, encodes the non-timed set of images or timed sequence of images using a media encoder (e.g. image or video encoder) into encoded media data, and encapsulates the encoded media data in a media file 101 using the encapsulation module 150. The encapsulation module 150 comprises at least one of a writer or a packager to encapsulate the encoded media data. The media encoder may be implemented within the encapsulation module 150 to encode the received content, or it may be separate from the encapsulation module 150. The encapsulation module 150 can thus be dedicated only for encapsulating already encoded content (encoded media data). The encoding step is optional, encoded media data may correspond to raw media data.

According to an embodiment, the system 195 is for processing encapsulated encoded media data for displaying/outputting to a user. The system 195 obtains/receives a media file 101 via the communication network 199 or by reading a storage mean, de-encapsulates the media file 101 to retrieve encoded media data using a de-encapsulation module 100, and decodes the encoded media data into an audio and/or video content (signal) using a media decoder. The de-encapsulation module 100 comprises at least one of a parser or player. The media decoder may be implemented within the de-encapsulation module 100 to decode the encoded media data, or it may be separate from the de-encapsulation module 100.

The media file 101 is communicated to the parser or player of module 100 in a number of ways, for example it may be generated in advance by the writer or packager of encapsulation module 150 and stored as data in a storage apparatus in the communication network 199 (e.g. on a server or a cloud storage) until a user requests the content encoded therein from the storage apparatus. Upon requesting the content, the data is communicated/streamed to the de-encapsulation module 100 from the storage apparatus.

The system 191 may also comprise a content providing apparatus for providing/streaming content information to the user for the content stored in the storage apparatus (e.g. content information may be described via a manifest file including the title of the content and other descriptive metadata and storage location data for identifying, selecting and requesting the content). The content providing apparatus may also be adapted for receiving and processing a user request for a content to be delivered/streamed from the storage apparatus to the user terminal.

Alternatively, the encapsulation module 150 may generate the media file 101 and communicates/streams it directly to the de-encapsulation module 100 as and when the user requests the content. The de-encapsulation module 100 then receives the media file 101 and performs the de-encapsulating and the decoding of media data according to embodiments of the invention to obtain/generate a video signal 109 and/or audio signal, which is then used by a user terminal to provide the requested content to the user.

The user has access to the audio/video content (signal) through a user interface of a user terminal comprising the module 100 or a user terminal that has means to communicate with the module 100. Such a user terminal may be a computer, a mobile phone, a tablet or any other type of device capable of providing/displaying the content to the user.

According to one implementation, the media file 101 encapsulates encoded media data (e.g. encoded audio or video) into boxes according to ISO Base Media File Format (ISOBMFF, ISO/IEC 14496-12 and ISO/IEC 14496-15 standards). The media file 101 may correspond to one single media file (prefixed by a FileTypeBox 'ftyp') or one or more segment files (prefixed by a SegmentTypeBox 'styp') following one media file (prefixed by a FileTypeBox 'ftyp'). According to ISOBMFF, the media file 101 may include two kinds of boxes; "media data" boxes ('mdat' or 'imda') containing the media data and "metadata boxes" ('moov' or 'moof' or 'meta' box hierarchy) containing the metadata defining placement and timing of the media data.

An image or video encoder encodes image or video content using an image or video standard to generate encoded media data. For instance, Image or Video coding/decoding (codecs) standards include ITU-T H.261, ISO/IEC MPEG-1 Visual, ITU-T H.262 (ISO/IEC MPEG-2 Visual), ITU-T H.263 (ISO/IEC MPEG-4 Visual), ITU-T H.264 (ISO/IEC MPEG-4 AVC), including its scalable video coding (SVC) and multi-view video coding (MVC) extensions, ITU-T H.265 (HEVC), including its scalable (SHVC) and multi-view (MV-HEVC) extensions.

Many embodiments described herein describe examples using the HEVC standard, or extensions thereof. However, the techniques and systems described herein may also be applicable to other coding standards already available, such as AVC, or not yet available or developed, such as ITU-T H.VVC (ISO/IEC MPEG-I VVC) (Versatile Video Coding) that is under specification.

Figure 2:
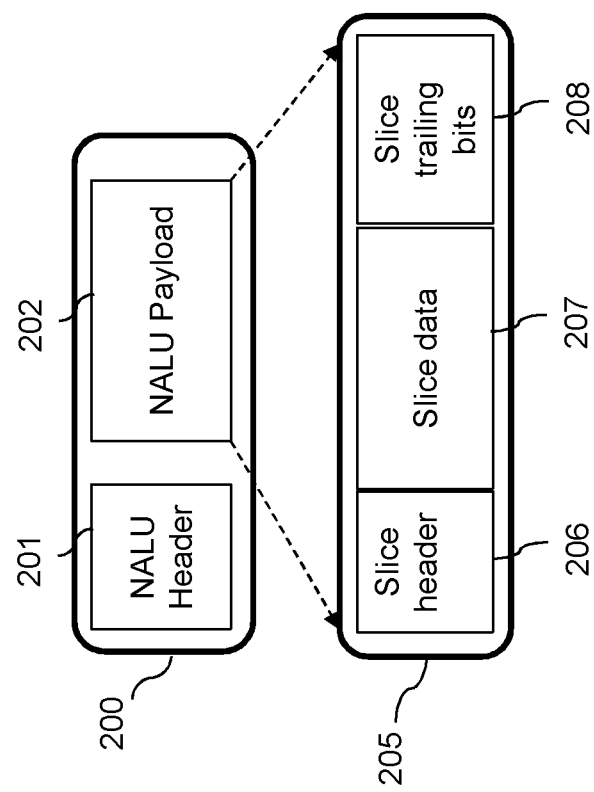
FIG. 2 illustrates structure example of a NAL (Network Abstraction Layer) Unit.

FIG. 2 illustrates structure example of a NAL (Network Abstraction Layer) Unit 200 used in video codecs such as H.264/AVC, HEVC/H.265 or VVC.

A NAL unit contains a NAL unit header 201 and a NAL unit payload 202. The NAL unit header 201 has a fixed length and provides general information on the NAL unit. For example, in HEVC, the NAL Unit header 201 indicates a type, an identifier of a layer and an identifier of a temporal sub-layer for each NAL unit. There are two main types of NAL units 200: Video Coding Layer NAL units (VCL-NAL) and Non-VCL NAL units. A VCL NAL unit typically contains in its payload a coded slice segment 205. A Non-VCL NAL unit typically contains parameter sets (i.e. configuration information) or Supplemental Enhancement Information messages.

A coded slice segment 205 is encoded in the HEVC bitstream (encoded media data) as a slice_segment_header or "slice header" 206 followed by slice_segment_data or"slicedata"207 and followed by rbsp_slice_segment_trailing_bits or "slice trailing bits" 208 for ensuring byte-alignment. A slice segment contains an integer number of consecutive (in raster scan order) Coding Tree Units (i.e. blocks in a picture). The slice does not necessarily have a rectangular shape (it is thus less appropriate than tiles for spatial sub-part representations). Video compression formats define an access unit as a set of NAL units, consecutive in decoding order, corresponding to a coded picture.

Figure 3A:
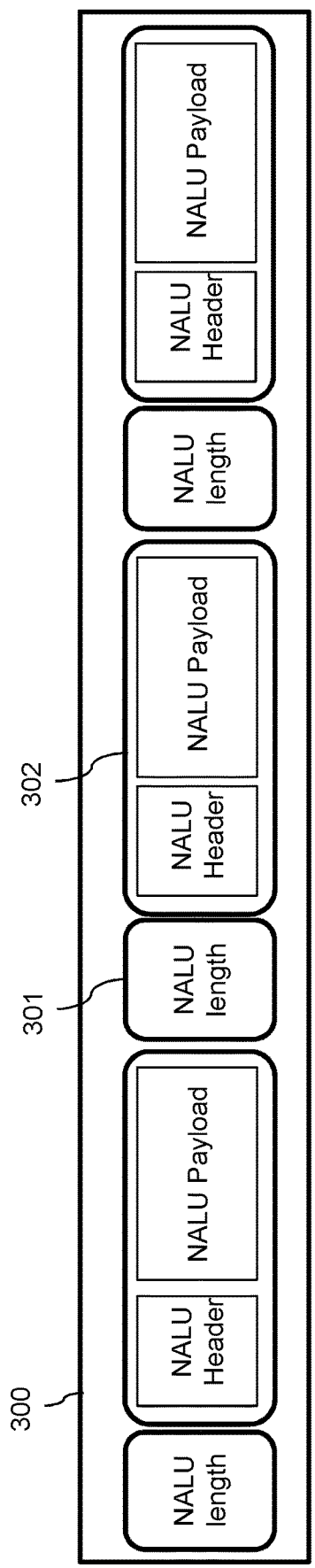
FIG. 3a illustrates structure example of a video media sample according to ISO Base Media File Format.

FIG. 3a illustrates structure example of a media (video) sample 300 according to ISO Base Media File Format.

A media sample is an audio/video data unit with a single time (e.g. an audio sample or a video frame). According to ISO/IEC 14496-15, a sample is a set of one or more NAL units 302 (similar to NAL unit 200 illustrated in FIG. 2) corresponding to an access unit or to a part of an access unit. Each NAL unit 302 is preceded by a NAL unit length field 301 providing the length in bytes of the NAL unit 302. For example, for single layer video, a sample corresponds to a coded picture. For layered video, a sample may correspond to a part of an access unit, for example to the NAL units for the base layer.

The sample size, in terms of bytes, is described in the sample size box 'ssz' or 'stsz2'. Given the sample size and the NAL unit length, an ISOBMFF parser (e.g. module 100) can determine the number of NAL units in a sample. ISO/IEC 14496-15 defines specific NAL units, Extractors and Aggregators that are specific ISOBMFF structures embedded within the media data ('mdat' box). They are also called "in-stream structure". An Extractor is an in-stream structure using a NAL unit header for extraction of data from other tracks. Extractors contain instructions on how to extract data from other tracks. Logically an Extractor can be seen as a pointer to data. While reading a track containing Extractors, the Extractor is replaced by the data it is pointing to. An Extractor may also directly contain data (inline data) to be used when replacing the Extractor. An Aggregator is a in-stream structure using a NAL unit header for grouping of NAL units belonging to the same sample.

Figure 3B:
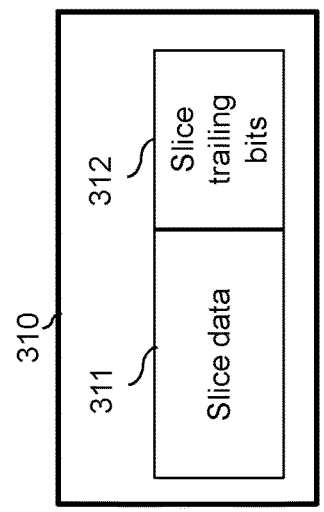
FIG. 3b illustrates another structure example of a video media sample according to ISO Base Media File Format.

FIG. 3b illustrates another structure example of a media (video) sample 310 according to ISO Base Media File Format.

According to ISO/IEC 14496-15, sample format of a track of type 'hvt2' may consists of one and only one instance of the HEVC syntax elements slice_segment_data( ) 311 and rbsp_slice_segment_trailing_bits( ) 312 of an independent slice segment. No other data is present in samples. Typically, this specific kind of sample format deliberately does not include HEVC syntax elements such as NAL unit header and slice_segment_header( ) for applications where these syntax elements may need to be rewritten. This happens when samples from different tracks contain NAL units that can be composed and merged to obtain a single bitstream of encoded media data to be decoded. For instance, when different tracks contain NAL units corresponding to different spatial sub-parts of a video content. In such case, NAL unit headers and slice_segment_header( ) would need to be rewritten during merge operation to obtain a conformant bitstream of encoded media data, e.g. slice addresses need to be recomputed and changed in the resulting bitstream. To avoid such rewriting, these headers are not encapsulated within the tracks containing the slice_segment_data( ) as usual, but they are rather encapsulated in one separate track (common to all tracks to be merged). This track contains Extractors and the slice segment headers natively. Extractors are specific structures that allow referencing and extracting data from samples of another referenced track. Samples of the bitstream to be decoded (containing NAL unit length field, NAL unit header, slice header, slice data and slice trailing bits) are obtained by resolving Extractors as illustrated in FIG. 4

Figure 4:
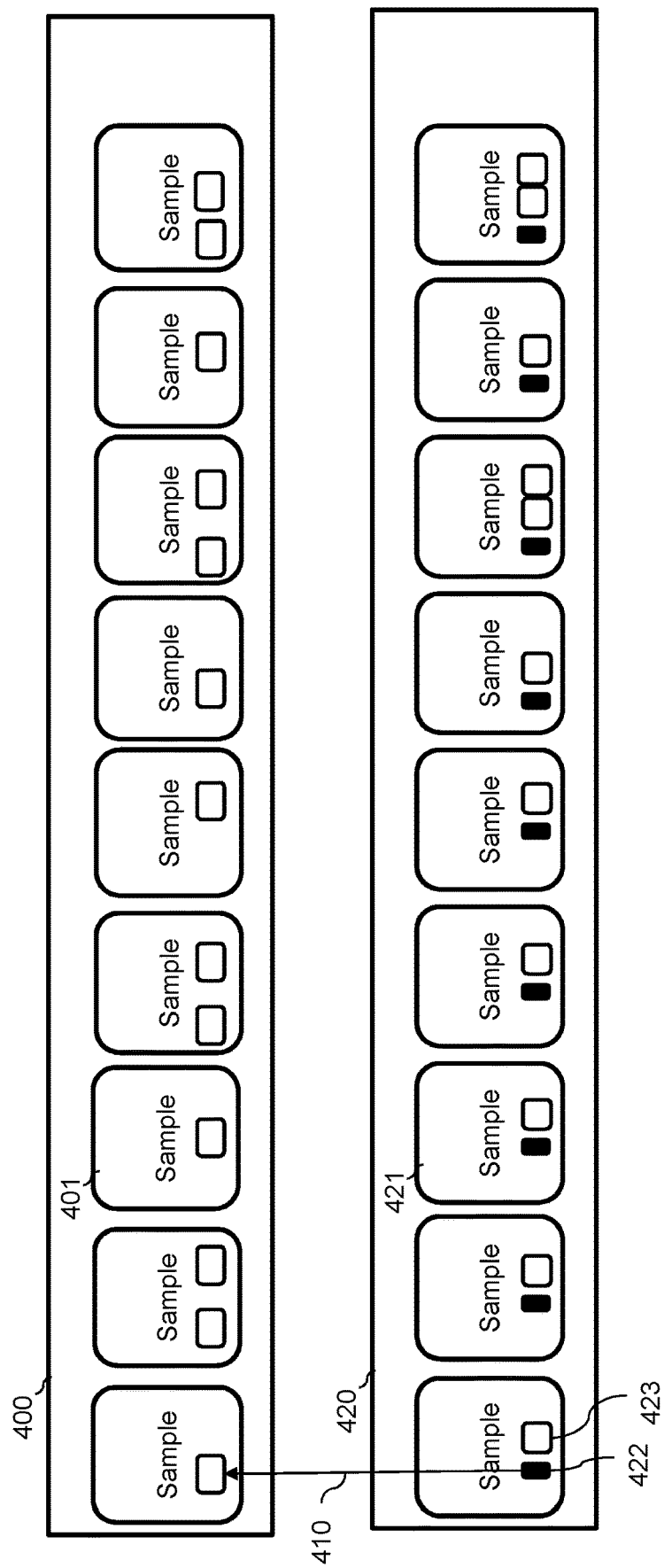
FIG. 4 illustrates an example Extractor and Aggregator structures according to ISO/IEC 14496-15.

FIG. 4 illustrates an example Extractor structure according to ISO/IEC 14496-15.

A first (media) track 400 corresponding to encoded media data (e.g. an encoded video bitstream) comprises media (e.g. video) samples 401, each media sample containing a set of one or more NAL units (each of them preceded by a NAL unit length field), as illustrated in FIG. 3a. The number of NAL units in a sample may vary from one to another. A second track 420, called for example reconstruction, composition, reference or extractor track, comprises samples 421 mixing NAL units 423 and Extractor NAL units 422 to reference data from another track, here the first track 400 as illustrated by the arrow 410. A sample 421 from current track 420 may then be reconstructed by extracting data from track 400 and concatenating it with data 423 from current track 420.

It can be noted that some samples 421 of the reconstruction track 420 may contain only Extractors or only data. The number of Extractors or NAL units may vary from one sample 421 to another. Extractors are NAL units and they are also preceded by a NAL unit length field as any other NAL units. The Extractor 422 is a structure that enables efficient extraction of NAL units from tracks other than the one containing the Extractor. The Extractor NAL unit is identified by a specific NAL unit type value (the specific value may depend on the codec in use in order not to conflict with codec-specific type values assigned to VLC and non-VLC NAL units).

The ISO/IEC 14496-15 defines Extractor for different compression formats: SVC, MVC, HEVC. For HEVC, Extractors are defined as a set of constructors as follows:

```
class aligned(8) Extractor ( ) {
    NALUnitHeader ( );
    do {
        unsigned int(8) constructor_type;
        if( constructor type == 0 )
            SampleConstructor( );
        else if ( constructor type == 2 )
            InlineConstructor( );
        else if( constructor type == 3 )
            SampleConstructorFromTrackGroup ( ) ;
    } while( !EndOfNALUnit( ) )
}
```

An Extractor is first composed of one NALUnitHeader( ) followed by one or more constructors for extracting data from the current track or from another track that is linked to the track in which the extractor resides by means of a track reference of type 'scal'.

Several types of constructors are specified:
A sample constructor (constructor_type=0) extracts, by reference, NAL unit data from a sample of another track.
An in-line constructor (constructor_type=1) includes NAL unit data
A sample constructor from a track group (constructor_type=2) extracts, by reference, NAL unit data (according to a copy mode, either entire NAL unit or NAL unit payload) from a sample of another track or track in a track group For HEVC, NALUnitHeader( ) corresponds to the first two bytes of ISO/IEC 23008-2 NAL units with the specific NAL unit type value (nal_unit_type) equal to the reserved value for Extractors (=49).

EndOfNALUnit( ) is a function that returns 0 (false) when more data follows in this extractor; otherwise it returns 1 (true).

Each constructor may contain multiple attributes to characterize the data to be extracted.

Extractors shall be declared in each sample of an extractor track that references NAL unit data or part of NAL unit data from a sample of another track or track group. In typical usage with sub-picture/slice/tile extraction, Extractors are mostly repeated structures and most of their constructor's attributes are simply repeated from one Extractor to another. For instance, sample constructor and sample constructor from a track group have a track_ref_index attribute that specifies the index of the track reference of type 'scal' to use to find the track from which to extract data. Typically, the value of this attribute is not willing to change very often from one sample to another. As another example, when the extraction of data only refers to time-aligned samples of other tracks, the attribute sample_offset is typically 0 in all extractors.

According to one aspect of the invention it is proposed a mechanism to optimize the signaling cost of Extractors by declaring default constructors and by defining a new constructor referring to these default constructors. One advantage is that declaring Extractors referring to default constructors allows reducing the description size of each Extractor in each sample of an extractor track when constructor's attributes are mostly repeated values all over the track. A list of default constructors may be defined in the metadata part of the extractor track. In the media data part, in the samples, a new type of constructor, a reference constructor, is proposed that reference a default constructor in the list of default constructors. For example, the reference constructor may contain an index in the list of default constructors. Accordingly, constructors that are used several times in an extractor track may be transmitted once in the list of default constructors.

When extractors are not based on constructors, the same mechanism may be applied at the extractor level. A list of default extractors may be defined in the metadata part of the extractor track. A new type of extractor, namely a reference extractor may be defined for referencing a default extractor. The reference extractor may be used in the media part of the extractor track, in samples, to reference a default extractor in the list of default extractors.

According to another aspect of the invention, a new type of inline constructor is proposed. Inline constructors may be used to provide a new NAL unit header. It happens that the inline constructor contains the NAL unit length field, and that this field may be rewritten according to the other constructors used to provide the payload of the NAL unit. When the NAL unit length field has been provided by an inline constructor and when it needs to be rewritten, its transmission in the inline constructor is useless. The new type of inline constructor proposed, explicitly does not contain any NAL unit length field, thus saving its transmission when it may be generated during the parsing of the extractor track.

Figure 5B:
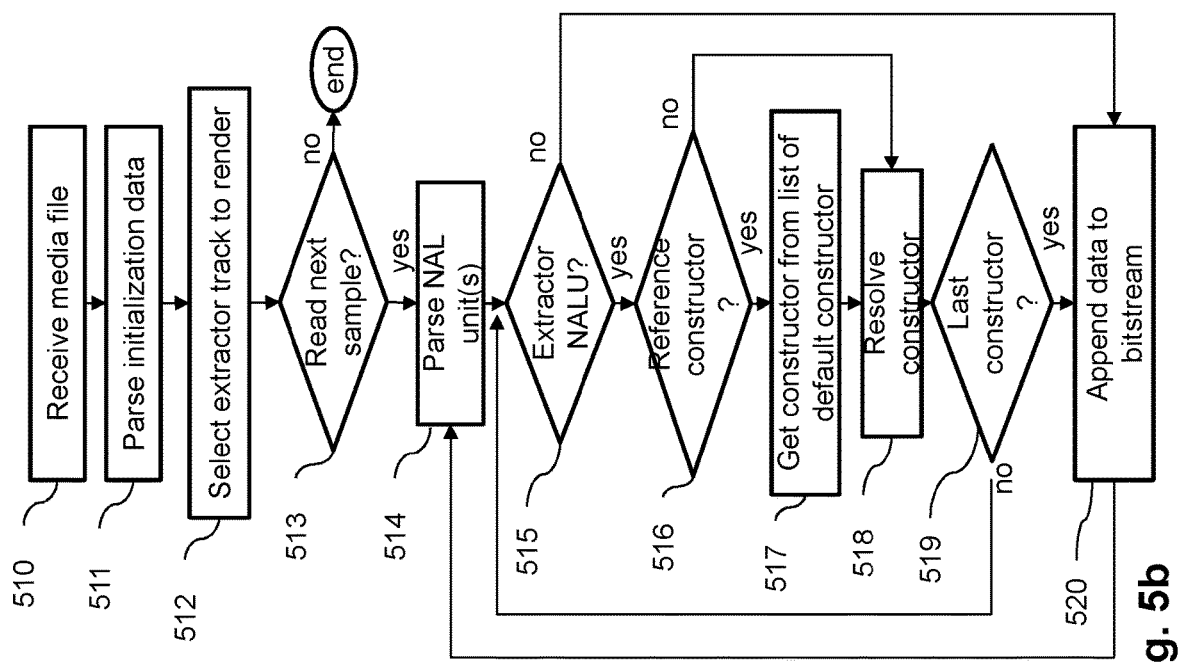
FIGS. 5a and 5b illustrate the encapsulation and de-encapsulation processes according to embodiments of the invention.
Figure 5A:
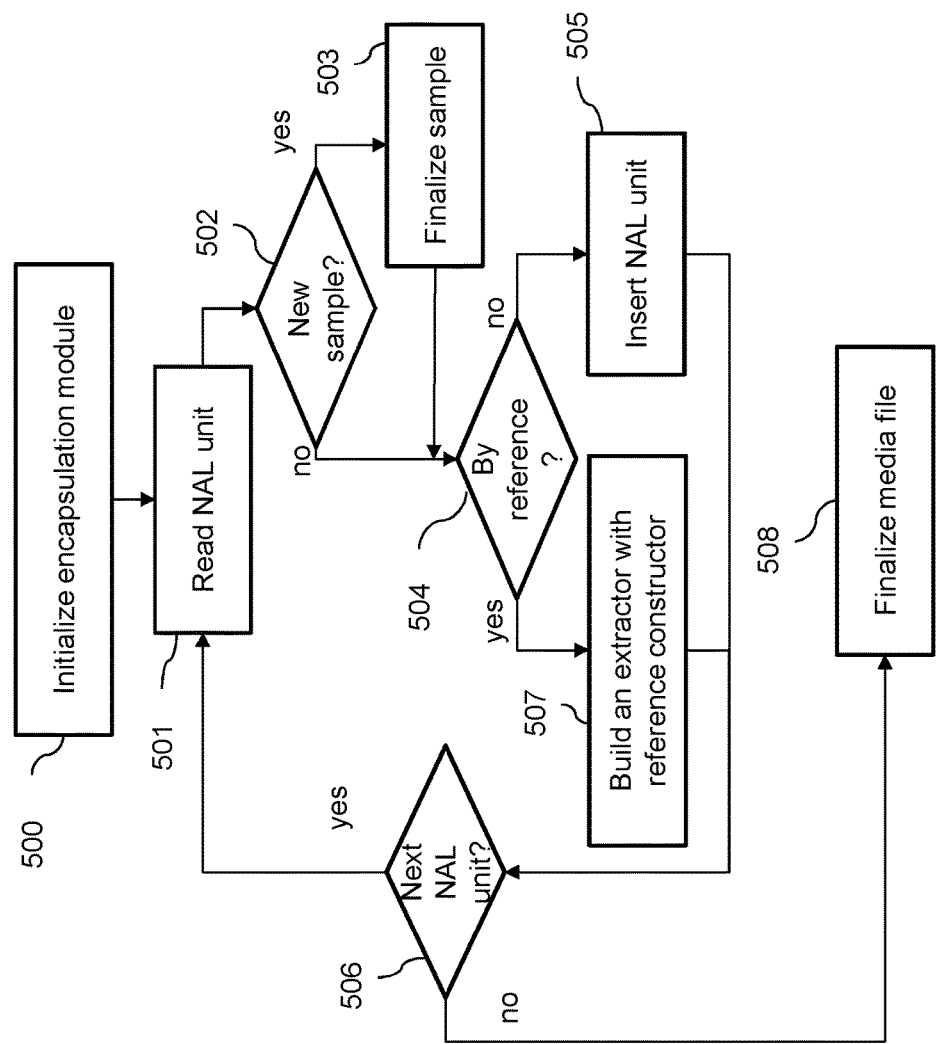

FIG. 5a illustrates the encapsulation process according to an embodiment of the invention. In an embodiment, the process is performed by the writer or the packager of encapsulation module 150 illustrated in FIG. 1 for encapsulating media data.

At step 500, the encapsulation module is initialized in order to be able to read properly the bitstream of encoded media data. The initialization may be performed by a user through a user interface or by an application. The initialization may concern identifying the syntax structures of the bitstream, referred to as data entities for generality, and configuring the encapsulation parameters. The configuring of the encapsulation may consist in deciding for example, whether to generate the media file 101 as one media file, or a plurality of media files constituting media segments composed of one or more media fragments; whether to include in the media file one track or multiple tracks for the video stream; setting the splitting of video tracks into parts, views or layers, etc.

When multiple tracks are included, the encapsulation module may set, during step 500, reference between tracks or define group of tracks. Thus, a track that is built by reference to one or more other tracks contains track references to these one or m ore tracks. A track reference may be of different types to describe the kind of relationship or dependency between the referencing track and the referenced track. The track reference type may be encoded using a four-character code. For example, according to ISO/IEC 14496-15, a type code 'scal' designates a track containing at least an extractor referencing another track from which data is extracted.

Extractor specified in ISO/IEC 14496-15 for H.264/AVC and HEVC enable compact formation of tracks that extract NAL unit data by reference. An extractor is a NAL-unit-like structure. A NAL-unit-like structure may be specified to comprise a NAL unit header and NAL unit payload like any NAL units, but start code emulation prevention (that is required for a NAL unit) might not be followed in a NAL-unit-like structure. For HEVC, an extractor contains one or more constructors. A sample constructor extracts, by reference, NAL unit data from a sample of another track. An inline constructor includes NAL unit data. When an extractor is processed by a file reader that requires it, the extractor is logically replaced by the bytes resulting when resolving the contained constructors in their appearance order. Nested extraction may be disallowed, e.g. the bytes referred to by a sample constructor shall not contain extractors; an extractor shall not reference, directly or indirectly, another extractor. An extractor may contain one or more constructors for extracting data from the current track of from another track that is linked to the track in which the extractor resides by means of a track reference of type 'scal'. The bytes of a resolved extractor may represent one or more entire NAL units. A resolved extractor starts with a valid length field and a NAL header. The bytes of a sample constructor are copied only from the single identified sample in the track referenced through the indicated 'scal' track reference. The alignment is on decoding time, i.e. using the time-to-sample table only, followed by a counted offset in sample number. An extractor track may be defined as a track that contains one or more extractors.

Once encapsulation module is initialized, the bitstream is read at step 501, NAL unit by NAL unit. The first NAL units, corresponding to parameter sets may be embedded in a DecoderConfigurationRecord structure, depending on the initialization at step 500 (in-band or out of band parameter sets). These parameter sets may be inspected by the writer or packager to know more about the bitstream partition and determine the number of separate tracks to create, one for each partition, plus one or more extractor tracks, each extractor track referencing with a track reference of type 'scal' one or more tracks containing a partition. Therefore, each extractor track represents a possible combination of all or a subset of partitioned tracks. For example, it can determine whether it is a tiled HEVC bitstream, for example by checking SEI (Supplemental Enhancement Information) messages for Temporal Motion-Constrained Tile Sets or tile presence in the Picture Parameter Set. It can define a track for each HEVC tile and one extractor track describing the composition of all HEVC tiles. When a NAL unit is read at step 501, the writer checks at step 502 whether it corresponds to a new sample or not. This can be done for example by decoding the picture order count or by checking whether the slice corresponding to the NAL unit is the first slice in picture. If yes, the previous sample is finalized in step 503 by setting parameters of the sample description (size, position in the media data, properties in some sample groups . . . ). In particular, it resets the sample size to 0, a NAL unit count to 0. Then, it checks at step 504 whether the current NAL unit should be included in the media part of an extractor track, or whether it should be included to the media part of a partitioned track and referenced from an extractor track, or should be partly included to the media part of a partitioned track and partly modified and referenced by the extractor track. This is determined from the track dependencies or relationships set up during the initialization step 500. If the NAL unit is not referenced, the length of the NAL unit is first inserted in media data box of the extractor track, followed by the NAL Unit header and NAL Unit payload (step 505). The size of the current sample is then incremented with the number of bytes for these three structures and the writer or packager checks for the next NAL unit from the bitstream of encoded media data at step 506. If this is not the last NAL unit, the process iterates to step 501 until all NAL units are processed.

If a NAL unit is to be included partly or fully in the extractor track by reference (test 504 true), the writer or packager includes, at step 507, NAL unit data to be referenced in the media data box of a partitioned track (with a preceding NAL unit length field if the NAL unit data is a complete NAL unit) and an extractor with one or more constructors and associated attributes in the extractor track according to embodiments of the invention. In particular, the process appends a NAL unit length field with the size of an Extractor structure in bytes in the media data box of the extractor track, and creates an Extractor NAL unit. When the extractor comprises a constructor that corresponds to a repeated structure along samples, a default constructor may be inserted into a list of default constructors, if not already present, in the sample entry of the extractor track. The created Extractor NAL unit includes a reference constructor providing the index of the default constructor to be used from the list of default constructors.

When the extractor is written in the media data box, the sample description is updated (sample size, current NALU index in the sample, etc.). The writer or packager then checks for the next NAL unit at step 506. When the last NAL unit is reached, the writer terminates the media file at step 508, for example by writing the size of the last sample, index tables, user data or any metadata on the media.

Note that when the initialization step 500 indicates an encapsulation into segments, an additional test is performed (not represented) before starting a new sample to check whether the segment duration is reached or not. When segment duration is reached, the segment is finalized and is ready to be used by a player or to be sent over a distribution network. When segment duration is not reached, the writer or packager iterates on samples and NAL units.

FIG. 5b illustrates the de-encapsulation process according to an embodiment of the invention. In an implementation, the process is performed by the parser or the player of de-encapsulation module 100 illustrated in FIG. 1 for de-encapsulating media data.

At step 510, the player first receives a media file 101 (as one file or as consecutive segments). The file may be stored in memory of the parser or player, or may be read from a network socket.

First, the initialization data, typically the 'moov' box and its sub-boxes are parsed at step 511 to know the parameters/settings of the media file: number of tracks, track relationships and dependencies, type of samples, durations, positions and sizes, etc.

From the set of tracks determined at step 511, the player or parser selects at step 512 one extractor track to be rendered. Then, the reconstruction begins by parsing the media data box sample by sample.

The parser or player iterates over samples until the end of the file is reached (test 513 negative). In case of segments, when one segment is fully read, the parser reads the next segment, sample by sample.

For a given sample, the process reads data from the position indicated by the chunk offset box plus the cumulated sizes of previous samples parsed for this chunk. From this position, the parser finds a NAL unit length field. The parser then reads the number of bytes given by the NAL unit length field to get the complete NAL unit. If the NAL unit corresponds to an Extractor (test 515), the parser reads at step 516 the constructor type attribute of the next constructor in the Extractor. If the constructor is a reference constructor according to an aspect of the invention, the parser retrieves at step 517 from the reference constructor the index of the default constructor that shall be used to resolve the constructor at step 518. The default constructor is then retrieved from the list of default constructors (the index value representing the position in the list) either defined in sample entry or in a sample group description associated to current sample via sample grouping mechanism. The default constructor can be any type of constructors (e.g. inline, sample, . . . ) except another reference constructor. Constructors (either directly retrieved in the Extractor NALU or referenced via a reference constructor) are resolved at step 518 according to the semantic associated to their type. Data obtained by resolving all constructors (test 519) of the Extractor NAL Unit is appended to the reconstructed bitstream of encoded media data at step 520.

If at step 515 the NAL unit is not an Extractor, the parser appends at step 520 the bytes corresponding to the NAL Unit header and NAL Unit payload (without the NAL unit length) to the reconstructed bitstream of encoded media data that will be provided to the media decoder for decoding. After step 520, the process iterates on the next NAL unit (go to step 514) until the size of the current sample is reached.

In the following, examples are provided to illustrate the constructor for Extractor and default values for extractor constructors proposed according to embodiments of the invention. The new constructor implements a reference index attribute as discussed above in steps 507 and 516 of the encapsulation/de-encapsulation processes of FIGS. 5a and 5b.

The implementation of a reference index to designate a default constructor or a default Extractor is applicable for both Extractors without constructors such as SVC, MVC Extractors, and Extractors with Constructors, such as HEVC or L-HEVC Extractors. For Extractors with constructors, a new kind of Constructor may be defined as follows (identified by a "constructor_type"):

```
class aligned(8) Extractor ( ) {
    NALUnitHeader( );
    do {
        unsigned int(8) constructor_type;
        if( constructor_type == 0 )
            SampleConstructor( ) ;
        else if ( constructor_type == 2 )
            InlineConstructor( ) ;
        else if ( constructor_type == 3 )
            SampleConstructorFromTrackGroup ( ) ;
        else if ( constructor_type == 4 )
            ReferenceConstructor( )
    } while( !EndOfNALUnit( ) )
}
``` where constructor_type specifies the constructor that follows. SampleConstructor, InlineConstructor, SampleConstructorFromTrackGroup and ReferenceConstructor correspond to constructor_type equal to 0, 2, 3 and 4, respectively. Other values of constructor_type are reserved.

The name of the new Constructor 'ReferenceConstructor' is provided as an example. Furthermore, the reserved 'constructor_type' value '4' is provided as an example. The new Constructor instead of indicating (SampleConstructor) or providing ('InlineConstructor') byte ranges, allows referencing default constructors declared in the meta data part of the extractor track, typically in a list in sample entry or a sample group description box. Any reserved name or reserved value for 'constructor_type' may be used. Typically, this new constructor_type value may be present and used in samples of an HEVC or L-HEVC tracks with sample entries of type 'hvc3' or 'hev3', or any other type of tracks later defined. The new Constructor may be defined, for example, as illustrated below:

```
class aligned (8) ReferenceConstructor ( ) {
    unsigned int (8) ref_index;
}
```

Where the parameters, fields or attributes of the new Constructor have the following semantics:

ref_index specifies the index of the constructor to use in the list of constructors of the DefaultHevcExtractorConstructorBox in sample entry of the track extracting the data. A value of 0 indicates the first entry.

Figure 6:
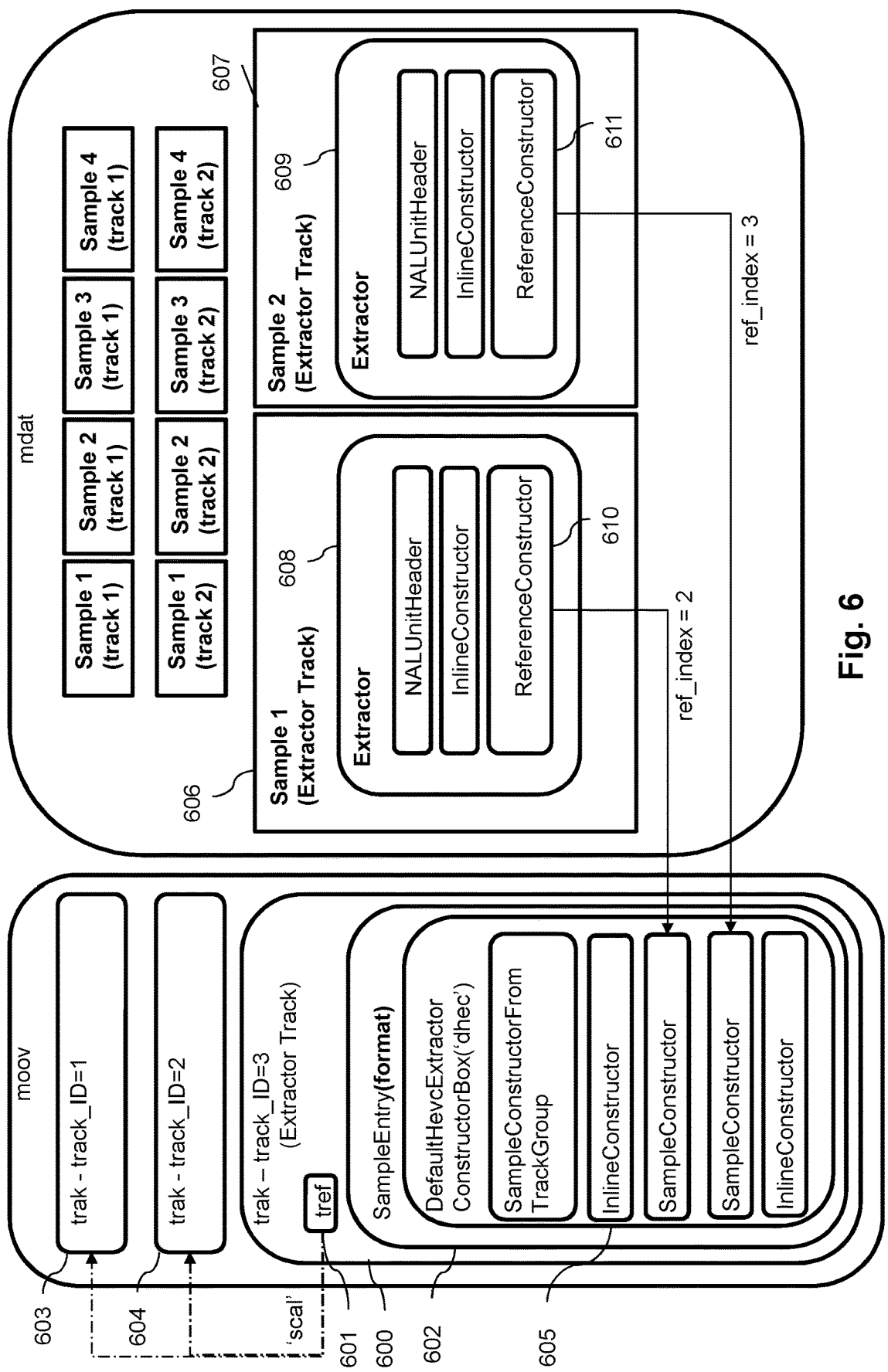
FIG. 6 illustrates the encapsulated file format according to embodiments of the invention

As illustrated in the example of encapsulation file for extractor tracks of FIG. 6, default values for extractor constructors are declared in a sample entry 602 of an extractor track 600. An extractor track is a track with a track reference box ('tref') 601 containing a TrackReferenceTypeBox with reference type equal to 'scal' referencing the identifiers track_ID of tracks (e.g. 603 and 604) or track_group_id of track groups (not represented) from which data may be extracted by an Extractor. Declaring the default values for extractor constructors in a sample entry ensures that their declarations can be shared by all samples in the Extractor track.

In an embodiment for HEVC or L-HEVC Extractors, a new box DefaultHevcExtractorConstructorBox 605 is defined in the sample entry 602 as follows (Similar embodiments can be easily derived for Extractors for other video formats than HEVC, such as AVC, SVC, MVC, VVC):

| | |
|---|---|
| Box Type: | 'dhec' |
| Container: | HEVCSampleEntry |
| Mandatory: | No |
| Quantity: | Zero or one for sample entry types 'hvc3' 'and hev3'. Zero for other sample entry types specified in ISO/IEC 14496-15. |

```
aligned(8) class DefaultHevcExtractorConstructorBox extends Box('dhec'){
    unsigned int(32) num_entries;
    for (i=1; i<= num_entries; i++) {
        unsigned int(8) constructor_type;
        if( constructor_type == 0 )
            SampleConstructor( );
        else if( constructor_type == 2)
            InlineConstructor( );
        else if( constructor_type == 3)
            SampleConstructorFromTrackGroup( );
    }
}
``` num_entries gives the number of default constructors defined in this box.

constructor_type gives the type of the constructor for this entry. Value 4 (i.e. ReferenceConstructor) shall not be present.

DefaultHevcExtractorConstructorBox provides a list of constructors to be used in place of ReferenceConstructor present in a sample. The constructors given in this box shall only be resolved as a replacement of a ReferenceConstructor constructor in a sample. The DefaultHevcExtractorConstructorBox may contain multiple constructors with same constructor_type. One advantage of being able to declare multiple constructors with same constructor_type is the possibility to change default values to apply along time in the Extractor track, for instance due to some Picture Parameter Set (PPS) variations that may require slight modifications of Extractor definition. In such case, an Extractor may simply include a ReferenceConstructor with a different ref_index value to reference a different default constructor in the DefaultHevcExtractorConstructorBox and thus use different default attribute values for a same type of constructor as illustrated in FIG. 6. Two samples 606 and 607 of the extractor track 600 include extractors 608 and 609, each of them containing a ReferenceConstructor respectively 610 and 611 with a ref_index attribute referencing different alternatives of default constructors.

For better maintenance of the specification, Extractor and DefaultHevcExtractorConstructorBox may also be redefined as below with same semantics as described above:

```
class aligned(8) ExtractorConstructor ( ) {
    unsigned int(8) constructor_type;
    if( constructor_type == 0 )
        SampleConstructor ( ) ;
    else if( constructor_type == 2 )
        InlineConstructor ( ) ;
    else if( constructor_type == 3 )
        SampleConstructorFromTrackGroup ( ) ;
    else if( constructor_type == 4 )
        ReferenceConstructor ( );
}
class aligned(8) Extractor ( ) {
    NALUnitHeader( );
    do {
        ExtractorConstructor constructor;
    } while( !EndOfNALUnit( ) )
}
aligned(8) class DefaultHevcExtractorConstructorBox extends Box('dhec'){
    unsigned int(32) num_entries;
    for (i=1; i<= num_entries; i++) {
        ExtractorConstructor constructor;
    }
}
```

In above embodiments, SampleConstructor InlineConstructor and SampleConstructorFromTrackGroup are defined as specified in ISO/IEC 14496-15 $5^{th}$ edition and its amendments.

In above embodiments, the design of defining default constructors in DefaultHevcExtractorConstructorBox located into a sample entry does not allow for updating the list of default constructors once the moov is produced, potentially forcing moov reloading when switching qualities. However, it would be still possible to build a bitstream of encoded media data compliant with above embodiments by not using anymore default constructors when they do not apply anymore for instance after switching qualities.

If it is desirable of being able to update the list of default constructors once the moov is produced, an alternative embodiment is to replace the declaration of DefaultHevcExtractorConstructorBox in sample entry with the use of sample grouping mechanism and a new sample group definition. This alternative embodiment would require double references, first to associate each sample of the extractor track with an visual sample group entry defined in a sample group description box ('sgpd') with a given grouping_type (the association being done via the group_description_index of a SampleToGroupBox with same grouping_type) and second the ref_index from ReferenceConstructor should reference an entry in the list of constructors in the visual sample group entry associated with the sample.

According to this embodiment, a new grouping_type is defined, e.g. 'dhec' and a new VisualSampleGroupEntry is defined as follows:

```
aligned(8) class DefaultHevcExtractorConstructorSampleGroupEntry( )
    extend VisualSampleGroupEntry ('dhec') {
    unsigned int(32) num_entries;
    for (i=1; i<= num_entries; i++) {
        unsigned int(8) constructor_type;
        if( constructor_type == 0 )
            SampleConstructor( );
        else if( constructor_type == 2)
            InlineConstructor( );
        else if( constructor_type == 3)
            SampleConstructorFromTrackGroup( );
    }
}
```

The name of the new visual sample group entry 'DefaultHevcExtractorConstructorSampleGroupEntry' is provided as an example. Furthermore, the reserved 4CC value 'dhec' is provided as an example. All attributes in this new class have same semantics as for DefaultHevcExtractorConstructorBox.

The semantic of the ref_index in ReferenceConstructor is then defined, for example, as follows:

ref_index specifies the index of the constructor to use in the list of constructors of the DefaultHevcExtractorConstructorSampleGroupEntry associated with the sample via the group_description_index of a SampleToGroupBox ('sbgp') with grouping_type equal to 'dhec'. A value of 0 indicates the first entry.

With such embodiment, it is possible to use the default sample group mechanism defined in ISO/IEC 14496-12 to associate a default visual sample group entry 'Default- HevcExtractorConstructorSampleGroupEntry' to samples without defining a SampleToGroupBox with same grouping_type. This allows saving some bytes (corresponding to the definition of SampleToGroupBox) when the list of default constructors is not changing over time.

With such embodiment, it is also possible to update the list of default constructors by creating a new ISOBMFF movie fragment (couple of boxes 'moof' and 'mdat') in which a new DefaultHevcExtractorConstructorSampleGroupEntry is defined in a new SampleGroupDescriptionBox('sgpd') with grouping_type 'dhec' in the track fragment ('traf') corresponding to the extractor track in the movie fragment box (moor). In addition, a new SampleToGroupBox with same grouping_type 'dhec' may also be defined in the movie fragment to associate the new DefaultHevcExtractorConstructorSampleGroupEntry with the Extractor track's samples of the movie fragment.

In a variant, the new visual sample group entry DefaultExtractorConstructorSampleGroupEntry( ) may also include a unique identifier groupID as follows:

```
aligned(8) class DefaultExtractorConstructorSampleGroupEntry( ) extend
VisualSampleGroupEntry ('dhec') {
  unsigned int(32) groupID;
  unsigned int(32) num_entries;
  for (i=1; i<= num_entries; i++) {
    unsigned int(8) constructor_type;
    if( constructor_type == 0 )
      SampleConstructor( );
    else if( constructor_type == 2)
      InlineConstructor( );
    else if( constructor_type == 3)
      SampleConstructorFromTrackGroup( );
  }
}
``` where groupID is a unique identifier for the default extractor constructor group described by this sample group entry. The value of groupID in a default extractor constructor group entry shall be greater than 0. The value 0 is reserved for a special use.

When there is SampleToGroupBox of type 'nalm' and grouping_type_parameter equal to 'dhec', a SampleGroupDescriptionBox of type 'dhec' shall be present, and the following applies:

The value of groupID in a default extractor constructor group entry shall be equal to the groupID in one of the entries of NALUMapEntry.

A NAL unit being mapped to groupID 0 by a NALUMapEntry implies that the NAL unit is not an extractor or that the NAL unit does not reference any default constructors.

All other attributes in this new class have same semantics as for DefaultHevcExtractorConstructorBox.

With such variant, it is possible to use the NAL unit mapping mechanism defined in ISO/IEC 14496-15 to associate different lists of default constructors for each NAL Unit in a sample (rather than associating one single list of default constructors for all NAL units in a sample). In such case, a NALUMapEntry may be used to assign an identifier, called groupID, to each NAL unit in a sample. A NALUMapEntry is a visual sample group entry with grouping_type equal to 'nalm' and defined as below:

```
class NALUMapEntry( ) extends VisualSampleGroupEntry ('nalm') {
  bit (6) reserved = 0;
  unsigned int(1) large_size;
  unsigned int(1) rle;
  if (large_size) {
    unsigned int(16) entry_count;
  } else {
    unsigned int(8) entry_count;
  }
  for (i=1; i<= entry_count; i++) {
    if (rle) {
      if (large_size) {
        unsigned int(16) NALU_start_number;
      } else {
        unsigned int(8) NALU_start_number;
      }
    }
    unsigned int(16) groupID;
  }
}
``` where large_size indicates whether the number of NAL units entries in the track samples is represented on 8 or 16 bits.

rle indicates whether run-length encoding is used (1) to assign groupID to NAL units or not (0).

entry_count specifies the number of entries in the map. Note that when rle is equal to 1, the entry_count corresponds to the number of runs where consecutives NAL units are associated with the same group. When rle is equal to 0, entry_count represents the total number of NAL units.

NALU_start_number is the 1-based NAL unit index in the sample of the first NAL unit in the current run associated with groupID.

groupID specifies the unique identifier of the group. More information about the group is provided by the sample group description entry with this groupID and grouping_type equal to the grouping_type_parameter of the SampleToGroupBox of type 'nalm'.

The NALUMapEntry, when present, shall be linked to a sample group description providing the semantics of that groupID. This link shall be provided by setting the grouping_type_parameter of the SampleToGroupBox of type 'nalm' to the four-character code of the associated sample grouping type.

According to this variant, a SampleToGroupBox with grouping_type equal to 'nalm' and grouping_type_parameter equal to 'dhec' is defined to associate each sample of an Extractor track with a NALUMapEntry, each NALUMapEntry being defined in a SampleGroupDescriptionBox ('sgpd') with grouping_type equal to 'nalm' and describing the association of groupIDS with each NAL unit in the sample. Another SampleGroupDescriptionBox('sgpd') with grouping_type equal to 'dhec' is defined with a set of DefaultExtractorConstructorSampleGroupEntry, each entry providing the list of default constructors corresponding to the groupID associated with a NAL unit. Finally, the ref_index in the ReferenceConstructor contained in the NAL unit provides the index of the constructor to use in the list of default constructors.

Similar embodiment can be easily derived to associate different lists of default extractors (rather than constructors) to each NAL unit of a sample.

In an alternative embodiment, for video format that does not use Extractor with constructors, but only simple Extractors, a new Extractor can be defined, with a reserved NAL Unit type to distinguish the new Extractor referencing a default Extractor defined in sample entry or in a sample group description box from existing byte-based Extractor. The new Extractor, called for example "ReferenceExtractor" is defined as follows:

```
class aligned(8) ReferenceExtractor ( ) {
    NALUnitHeader( );
    unsigned int(8) ref_index;
}
```

Where
ref_index specifies the index of the Extractor to use in the list of Extractors of the DefaultHevcExtractorBox in sample entry of the track extracting the data. A value of 0 indicates the first entry The main difference is that here we have a specific 'NALUnitHeader'. 'NALUnitHeader' is a NAL Unit header corresponding to the video coding format in use but with a reserved value that is not already reserved for any VCL, non-VCL NAL unit of the video coding format in use or existing Extractor or Aggregator.

In this embodiment, default extractors are defined in sample entry in a DefaultHevcExtractorBox as follows:

Box Type:       'dhec'
Container:      HEVCSampleEntry
Mandatory:      No
Quantity:       Zero or one for sample entry types 'hvc3' and 'hev3'.
                Zero for other sample entry types specified in ISO/IEC 14496-15.
aligned(8) class DefaultHevcExtractorBox extends Box('dhec'){
  unsigned int(32) num_entries;
  for (i=1; i<= num_entries; i++) {
    unsigned int(16) nalUnitLength;
    bit(8*nalUnitLength) nalUnitExtractor;
  }
} where
num_entries gives the number of default extractors defined in this box.
nalUnitLength gives the length in bytes of nalUnitExtractor.
nalUnitExtractor is the default extractors defined for this entry. The nal_unit_type of nalUnitExtractor shall be a valid Extractor, and ReferenceExtractor shall not be present.

According to another aspect of the invention, Extractors were originally designed in AVC/SVC/MVC to extract a complete set (1 or more) of NAL Units, each data reference (extracted byte range) starting with a NAL Unit length field using 1 to 4 bytes to provide the length of the following NAL unit (depending on the value of LengthSizeMinusOne attribute in the associated Decoder Configuration Record). With the introduction of inline constructors in HEVC combined with hvt1 or hvt2 sample data (e.g. to rewrite a slice header), constructors (e.g. SampleConstructor or SampleConstructorFromTrackGroup) can be used to extract sample data starting from non NAL Unit length field offsets, inline constructors being use to rewrite the beginning of NAL Unit. Indeed, for instance, hvt2 sample data only contains subset of NAL Units, typically only slice data and slice trailing bits without the NAL Unit header and without the slice header. In such case, it is not clear where and how the NAL Unit length is defined after extraction of a range of sample data, in particular when an Extractor (composed of multiple constructors) resolved to multiple NAL Units. In addition, when processing a sample constructor, a reader does not easily know if the data offset in the extracted sample corresponds to the first byte of a NAL Unit length field or not; it has to parse all previous NAL units from the extracted sample to figure this out. It is also not clear whether inline constructor shall include NAL Unit Length field, but if it includes NAL Unit Length field, this one may need rewriting to match with the extracted bytes from following constructor. We can observe that defining NALU length field in inline constructor may result in up to 4-bytes wasted in the inline constructor, in particular when it needs to be rewritten.

In order to optimized both in size and in complexity for the reader, a new explicit NAL start inline constructor is defined in a way that would avoid a file reader to maintain a state of "these extracted bytes need NALU length field rewrite or no/where to rewrite this field".

The Extractor with the inline constructor explicitly starting a NALU but without a NALU length field embedded is defined as follows:

```
class aligned(8) Extractor ( ) {
    NALUnitHeader( );
    do {
        unsigned int(8) constructor_type;
        if( constructor_type == 0 )
            SampleConstructor( );
        else if( constructor_type == 2 )
            InlineConstructor( );
        else if ( constructor_type == 3 )
            SampleConstructorFromTrackGroup ( ) ;
        else if( constructor_type == 4 )
            ReferenceConstructor ( );
        else if ( constructor_type == 5 )
            NALUStartInlineConstructor ( )
    } while( !EndOfNALUnit( ) )
}
```

The name of the new Constructor 'NALUStartInlineConstructor' is provided as an example. Furthermore, the reserved 'constructor_type' value '5' is provided as an example.

The NALUStartInlineConstructor is used to indicate that a NAL Unit starts at this constructor, and expands to the immediately following constructor, if any. The inline_data contains the beginning of the NAL Unit (possibly including the NAL Unit header, part of the NAL Unit header, NAL Unit payload or part of NAL Unit payload), but does not contain any NAL Unit length field. This field shall be inserted by the file reader according to the track LengthSizeMinusOne field, and set to the complete NAL Unit size after processing this constructor and the immediately following constructor, if any.

NALUStartInlineConstructor is defined as follows:

```
class aligned(8) NALUStartInlineConstructor ( ) {
    unsigned int(8) length;
    unsigned int(8) inline_data[length];
}
``` where
length: is the number of bytes that belong to the NALUStartInlineConstructor following this field. The value of length shall be greater than 0. The value of length equal to 0 is reserved.
inline_data: is the data bytes to be returned when resolving the in-line constructor. These bytes shall contain either exactly one complete NAL unit if this is the last constructor in the extractor, or the beginning of a NAL unit Moreover the existing InlineConstructor (for constructor_type=2) is modified as follows:

```
class aligned(8) InlineConstructor ( ) {
    unsigned int(8) length;
    unsigned int(8) inline_data[length];
}
``` where
- length: is the number of bytes that belong to the InlineConstructor following this field. The value of length shall be greater than 0. The value of length equal to 0 is reserved.
- inline_data: is the data bytes to be returned when resolving the in-line constructor. There shall not be any bytes corresponding to a NAL Unit length field of the reconstructed NAL units of the extractor in these bytes.

Figure 7:
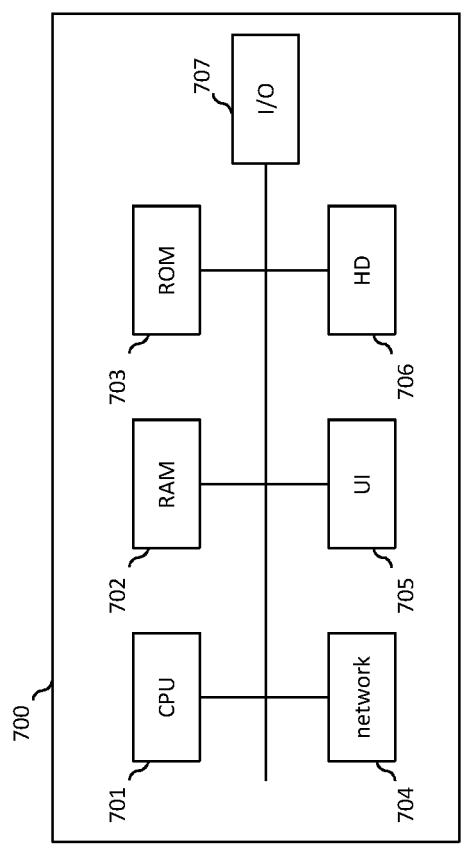
FIG. 7 is a schematic block diagram of a computing device for implementation of one or more embodiments of the invention.

FIG. 7 is a schematic block diagram of a computing device 700 for implementation of one or more embodiments of the invention. The computing device 700 may be a device such as a micro-computer, a workstation or a light portable device. The computing device 700 comprises a communication bus connected to:
- a central processing unit (CPU) 701, such as a microprocessor;
- a random access memory (RAM) 702 for storing the executable code of the method of embodiments of the invention as well as the registers adapted to record variables and parameters necessary for implementing the method for reading and writing the manifests and/or for encoding the video and/or for reading or generating data under a given file format, the memory capacity thereof can be expanded by an optional RAM connected to an expansion port for example;
- a read only memory (ROM) 703 for storing computer programs for implementing embodiments of the invention;
- a network interface 704 that is, in turn, typically connected to a communication network over which digital data to be processed are transmitted or received. The network interface 704 can be a single network interface, or composed of a set of different network interfaces (for instance wired and wireless interfaces, or different kinds of wired or wireless interfaces). Data are written to the network interface for transmission or are read from the network interface for reception under the control of the software application running in the CPU 701;
- a user interface (UI) 705 for receiving inputs from a user or to display information to a user;
- a hard disk (HD) 706;
- an I/O module 707 for receiving/sending data from/to external devices such as a video source or display.

The executable code may be stored either in read only memory 703, on the hard disk 706 or on a removable digital medium such as for example a disk. According to a variant, the executable code of the programs can be received by means of a communication network, via the network interface 704, in order to be stored in one of the storage means of the communication device 700, such as the hard disk 706, before being executed.

The central processing unit 701 is adapted to control and direct the execution of the instructions or portions of software code of the program or programs according to embodiments of the invention, which instructions are stored in one of the aforementioned storage means. After powering on, the CPU 701 is capable of executing instructions from main RAM memory 702 relating to a software application after those instructions have been loaded from the program ROM 703 or the hard-disc (HD) 706 for example. Such a software application, when executed by the CPU 701, causes the steps of the flowcharts shown in the previous figures to be performed.

In this embodiment, the apparatus is a programmable apparatus which uses software to implement the invention. However, alternatively, the present invention may be implemented in hardware (for example, in the form of an Application Specific Integrated Circuit or ASIC).

Although the present invention has been described hereinabove with reference to specific embodiments, the present invention is not limited to the specific embodiments, and modifications will be apparent to a person skilled in the art which lie within the scope of the present invention.

For example, the present invention may be embedded in a device like a camera, a smartphone, a head-mounted display or a tablet that acts as a remote controller for a TV or for multimedia display, for example to zoom in onto a particular region of interest. It can also be used from the same devices to have personalized browsing experience of a multimedia presentation by selecting specific areas of interest. Another usage from these devices and methods by a user is to share with other connected devices some selected sub-parts of his preferred videos. It can also be used with a smartphone or tablet to monitor what happens in a specific area of a building put under surveillance provided that the surveillance camera supports the method for providing data according to the invention.

Many further modifications and variations will suggest themselves to those versed in the art upon making reference to the foregoing illustrative embodiments, which are given by way of example only and which are not intended to limit the scope of the invention, that scope being determined solely by the appended claims. In particular the different features from different embodiments may be interchanged, where appropriate.

The invention claimed is:

1. A method for encapsulating media data into a media file compliant with the International Standard Organization Base Media File Format (ISOBMFF), the method comprising:
   generating a first track comprising media samples;
   generating a second track comprising a metadata part and a data part, the data part comprising a sample, the sample comprising an extractor, the extractor being a structure referencing data in a media sample contained in the first track, the extractor comprising at least one constructor and at least one constructor type, the at least one constructor being a structure containing attributes to characterize data to be extracted, each constructor being associated with a constructor type; and
   generating the media file including the first track and the second track,
   wherein the second track comprises, in the metadata part, a sample entry data structure including a list of default constructors, each default constructor containing predetermined attribute values to characterize data to be extracted;
   wherein the extractor in the sample of the second track comprises at least one reference constructor associated with a predetermined constructor type, the reference constructor comprising an index indicating one of the default constructors, in the list of default constructors, to be used in place of the reference constructor when processing the reference constructor.

2. The method of claim 1, wherein the list of default constructors is included in a sample group entry, the sample group entry being a data structure describing a group of samples of the second track, the extractor being included in a sample of the group of samples.

3. The method of claim 1, wherein the extractor comprises at least two constructors each of which is a reference constructor comprising a same index indicating a same default constructor in the list.

4. The method of claim 1, wherein the extractor comprises at least two constructors in which a first constructor is a reference constructor comprising a first index indicating a first default constructor in the list and a second constructor is a reference constructor comprising a second index indicating a second default constructor in the list.

5. The method of claim 1, wherein the constructor type associated with each constructor is one of constructor types including:
a sample constructor type which extracts Network Abstraction Layer (NAL) unit data from a sample of the first track;
an in-line constructor type which includes the NAL unit data, and the predetermined constructor type.

6. A method for encapsulating media data into a media file compliant with the International Standard Organization Base Media File Format (ISOBMFF), the method comprising:
generating a first track comprising media samples, each media sample containing a set of one or more Network Abstraction Layer (NAL) units;
generating a second track comprising an extractor, the extractor being a structure for extraction of data in a media sample contained in the first track, the extractor comprising at least one inline constructor, an inline constructor being a structure including NAL unit data to be returned when processing the constructor, and at least one constructor type, each constructor being associated with a constructor type; and
generating the media file including the first track and the second track,
wherein the constructor type associated with the at least one inline constructor of the extractor of the second track indicates that a NAL unit starts at this constructor and comprises NAL unit data starting with a NAL unit header and does not comprise any NAL unit length field, and that the at least one inline constructor requires to insert a NAL unit length field after processing the at least one inline constructor.

7. A method for parsing a media data in a media file compliant with the International Standard Organization Base Media File Format (ISOBMFF), the method comprising:
obtaining, in the media file, a first track comprising media samples;
obtaining, in the media file, a second track comprising a metadata part and a data part, the data part comprising a sample, the sample comprising an extractor, the extractor being a structure referencing data in a media sample contained in the first track, the extractor comprising at least one constructor and at least one constructor type, the at least one constructor being a structure containing attributes to characterize data to be extracted, each constructor being associated with a constructor type; and
wherein the method further comprises:
obtaining, in a sample entry data structure of the metadata part of the second track, a list of default constructors, each default constructor containing predetermined attribute values to characterize data to be extracted;
wherein the extractor in the sample of the second track comprises at least one reference constructor associated with a predetermined constructor type, the at least one reference constructor comprising an index indicating one of the default constructors, in the list of default constructors, to be used in place of the reference constructor when processing the reference constructor;
and wherein the method further comprises:
obtaining, from the first track, data referenced by the extractor based on the default constructor referenced by the index comprised in the at least one reference constructor.

8. The method of claim 7, wherein the extractor comprises at least two constructors each of which is a reference constructor comprising a same index indicating a same default constructor in the list.

9. The method of claim 7, wherein the extractor comprises at least two constructors in which a first constructor is a reference constructor comprising a first index indicating a first default constructor in the list and a second constructor is a reference constructor comprising a second index indicating a second default constructor in the list.

10. The method of claim 7, wherein the constructor type associated with each constructor is one of constructor types including:
a sample constructor type which extracts Network Abstraction Layer (NAL) unit data from a sample of the first track;
an in-line constructor type which includes the NAL unit data, and the predetermined constructor type.

11. A method for parsing a media data in a media file compliant with the International Standard Organization Base Media File Format (ISOBMFF), the method comprising:
obtaining, in the media file, a first track comprising media samples, each media sample containing a set of one or more Network Abstraction Layer (NAL) units;
obtaining, in the media file, a second track comprising an extractor, the extractor being a structure for extraction of data in a media sample contained in the first track, the extractor comprising at least one inline constructor, an inline constructor being a structure including NAL unit data to be returned when processing the constructor, and at least one constructor type, each constructor being associated with a constructor type; and
wherein the constructor type associated with the at least one inline constructor of the extractor of the second track indicates that a NAL unit starts at this constructor and comprises NAL unit data starting with a NAL unit header and does not comprise any NAL unit length field, and that the at least one inline constructor requires to insert a NAL unit length field after processing the at least one inline constructor.

12. A non-transitory computer-readable storage medium storing instructions of a computer program for implementing a method according to claim 1.

13. A device for encapsulating media data into a media file compliant with the International Standard Organization Base Media File Format (ISOBMFF), the device comprising a processor configured for:
generating a first track comprising media samples;
generating a second track comprising a metadata part and a data part comprising a sample, the sample comprising an extractor, the extractor being a structure referencing data in a media sample contained in the first track, the extractor comprising at least one constructor and at least one constructor type, each constructor being a structure containing attributes to characterize data to be extracted, each constructor being associated with a constructor type; and generating the media file including the first track and the second track, wherein the second track comprises, in the metadata part, a sample entry data structure including a list of default constructors, each default constructor containing predetermined attribute values to characterize data to be extracted, wherein the extractor in the sample of the second track comprises at least one reference constructor associated with a predetermined constructor type, the reference constructor comprising an index indicating one of the default constructors, in the list of default constructors, to be used in place of the reference constructor when processing the reference constructor.

14. The device of claim 13, wherein the constructor type associated with each constructor is one of constructor types including:

a sample constructor type which extracts Network Abstraction Layer (NAL) unit data from a sample of the first track;

an in-line constructor type which includes the NAL unit data, and the predetermined constructor type.

15. A device for encapsulating media data into a media file compliant with the International Standard Organization Base Media File Format (ISOBMFF), the device comprising a processor configured for:

generating a first track comprising media samples, each media sample containing a set of one or more Network Abstraction Layer (NAL) units;

generating a second track comprising an extractor, the extractor being a structure for extraction of data in a media sample contained in the first track, the extractor comprising at least one inline constructor, an inline constructor being a structure including NAL unit data to be returned when processing the constructor, and at least one constructor type, each constructor being associated with a constructor type; and generating the media file including the first track and the second track, wherein the constructor type associated with the at least one inline constructor of the extractor of the second track indicates that a NAL unit starts at this constructor, and comprises NAL unit data starting with a NAL unit header and does not comprise any NAL unit length field, and that the at least one inline constructor requires to insert a NAL unit length field after processing the at least one inline constructor.

16. The device of claim 15, wherein the constructor type associated with each constructor is one of constructor types including:

a sample constructor which extracts NAL unit data from a sample of the first track;

an in-line constructor type which includes the NAL unit data, and the predetermined constructor type.

17. A device for parsing a media data in a media file compliant with the International Standard Organization Base Media File Format (ISOBMFF), the device comprising a processor configured for:

obtaining, in the media file, a first track comprising media samples;

obtaining, in the media file, a second track comprising a metadata part and a data part, the data part comprising a sample, the sample comprising an extractor, the extractor being a structure referencing data in a media sample contained in the first track, the extractor comprising at least one constructor and at least one constructor type, the at least one constructor being a structure containing attributes to characterize data to be extracted, each constructor being associated with a constructor type; and wherein the method further comprises:

obtaining, in a sample entry data structure of the metadata part of the second track, a list of default constructors, each default constructor containing predetermined attribute values to characterize data to be extracted;

wherein the extractor in the sample of the second track comprises at least one reference constructor associated with a predetermined constructor type, the at least one reference constructor comprising an index indicating one of the default constructors, in the list of default constructors, to be used in place of the reference constructor when processing the reference constructor; and wherein the processor is configured for obtaining from the first track data referenced by the extractor based on the default constructor referenced by the index comprised in the at least one reference constructor.

18. A device for parsing a media data in a media file compliant with the International Standard Organization Base Media File Format (ISOBMFF), the device comprising a processor configured for:

obtaining, in the media file, a first track comprising media samples, each media sample containing a set of one or more Network Abstraction Layer (NAL) units;

obtaining, in the media file, a second track comprising an extractor, the extractor being a structure for extraction of data in a media sample contained in the first track, the extractor comprising at least one inline constructor, an inline constructor being a structure including NAL unit data to be returned when processing the constructor, and at least one constructor type, each constructor being associated with a constructor type; and wherein the constructor type associated with the at least one inline constructor of the extractor of the second track indicates that a NAL unit starts at this constructor and comprises NAL unit data starting with a NAL unit header and does not comprise any NAL unit length field, and that the at least one inline constructor requires to insert a NAL unit length field after processing the at least one inline constructor.

\* \* \* \* \*